United States Patent
Kancherla

(10) Patent No.: US 7,594,093 B1
(45) Date of Patent: Sep. 22, 2009

(54) VIRTUAL MEMORY MAPPING FOR EFFICIENT MEMORY USAGE

(75) Inventor: Mani Prasad Kancherla, Santa Clara, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 315 days.

(21) Appl. No.: 11/580,339

(22) Filed: Oct. 12, 2006

(51) Int. Cl.
*G06F 12/00* (2006.01)
(52) U.S. Cl. ....................................... 711/203
(58) Field of Classification Search ........................ None
See application file for complete search history.

(56) References Cited

U.S. PATENT DOCUMENTS

| | | | | |
|---|---|---|---|---|
| 6,088,777 | A * | 7/2000 | Sorber | 711/171 |
| 6,457,107 | B1 * | 9/2002 | Wynn et al. | 711/152 |
| 6,766,424 | B1 * | 7/2004 | Wilson | 711/148 |
| 2001/0032327 | A1 * | 10/2001 | Lin | 714/723 |
| 2004/0128463 | A1 * | 7/2004 | Kim et al. | 711/170 |
| 2006/0248234 | A1 * | 11/2006 | Pope et al. | 709/250 |
| 2006/0288129 | A1 * | 12/2006 | Pope et al. | 710/22 |
| 2007/0115982 | A1 * | 5/2007 | Pope et al. | 370/392 |

* cited by examiner

*Primary Examiner*—Kevin Verbrugge
(74) *Attorney, Agent, or Firm*—Townsend and Townsend and Crew LLP

(57) ABSTRACT

A processor (e.g. utilizing an operating system and/or circuitry) may access physical memory by paging, where a page is the smallest partition of memory mapped by the processor from a virtual address to a physical address. An application program executing on the processor addresses a virtual address space so that the application program may be unaware of physical memory paging mechanisms. A memory control layer manages physical memory space in units of sub-blocks, wherein a sub-blocks is smaller than a size of the page. Multiple virtual address blocks may be mapped to the same physical page in memory. A sub-block can be moved from a page (e.g. from one physical memory to a second physical memory) without moving other sub-blocks within the page in a manner that is transparent to the application program.

26 Claims, 5 Drawing Sheets

VIRTUAL MEMORY MAPPING FOR EFFICIENT MEMORY USAGE

BACKGROUND OF THE INVENTION

The present invention is related to computer systems, and in particular to techniques for virtual memory mapping for efficient memory usage.

Conventional computer systems generally use a range of memory and storage options, from the fast and expensive to the slow and inexpensive. A typical system may have a limited amount of fast/expensive memory (e.g., DRAM) and a relatively larger amount of slow/inexpensive memory (e.g., hard disk). In some systems the fast memory is used like a cache, where only data currently in use by an application is kept in the fast memory. When the application needs to work on a different chunk of data, data can be moved out of the fast memory to the slow memory and a new data chunk can be brought into the fast memory.

In one conventional approach for managing memory, applications are aware of different types of memories and manage the movement of data between different types of memory. Each application typically keeps only a limited amount of data in the fast memory, with other data kept in the slow memory. Each application includes memory management logic to ensure that the fast memory is used only as needed, and unneeded data is moved to slow memory. The memory management is thus non-transparent to the applications and tends to complicate applications. Further, this approach may also result in less than optimal use of memory, because applications that share memory may not have a global view of the need and usage of memory by other applications.

To keep applications simple, a second approach using virtual memory allows for managing memory in a manner that is transparent to applications. Each application addresses a virtual memory space so that the real location of data (whether it is in the fast memory or the slow memory) may be hidden from the application. From the application's perspective, the application is allocated a set of virtual addresses and always references the same virtual address for data, and thus does not need not be aware of where the data actually resides in the system. Hence, data can be moved by other mechanisms between the various types of memory, based on need, without applications needing to manage or even know the physical location of the data.

Generally, conventional processors support virtual memory using fixed block (page) sizes, such as 4 KB pages. Typically, virtual memory is allocated to applications such that a minimum allocated block size is the same as the page size of the processor. For example, if a system employs different types of memory and uses a processor that supports 4 KB pages, then the smallest unit of memory that is allocated from any of the memories is 4 KB if application transparency is to be maintained, even if the application needs less than 4 KB of data. For example, if an application needs a smaller block of memory, say 512 B, then a 4 KB chunk of memory is allocated for the block so that application transparency is maintained. However, making the minimum allocated block size the same as the page size of the processor potentially wastes available memory and restricts the minimum allocated block size by an application to the page size of the processor.

BRIEF SUMMARY OF THE INVENTION

Embodiments of the present invention provide techniques for allocating and managing smaller chunks of memory than the page size of a processor. A virtual address may map to a physical block of memory and be used to access a sub-block of memory that is smaller in size than the page size used by the system. Multiple virtual addresses may be mapped to a single physical block of memory. These different virtual addresses can be used to map and address different sub-blocks of the same block of physical memory.

In one embodiment, a memory management system comprises a processor configured to perform memory paging using a predetermined page size, and a memory control module (also referred to herein as a memory control layer). The memory control layer is configured to receive a first virtual address. The memory control layer is configured to map the first virtual address to a first sub-block in a first page of memory. The first sub-block has a size smaller than the predetermined page size.

In one embodiment, a method for memory management in a system comprising a processor configured to perform memory paging using a predetermined page size comprises receiving a first virtual address; and mapping the first virtual address to a first sub-block in a first page of physical memory, the first sub-block having a size smaller than the predetermined page size.

In one embodiment, a data processing system includes a processor and a memory configured to store data. The data processing system is configured to specify a first virtual address and map the first virtual address to a first sub-block in a first page of memory, the first sub-block having a size smaller than the predetermined page size.

DETAILED DESCRIPTION OF THE INVENTION

In the following description, for the purposes of explanation, specific details are set forth in order to provide a thorough understanding of the invention. However, it will be apparent that the invention may be practiced without these specific details.

In accordance with the present invention, a computing system includes a processor configured to perform paging using a predetermined page size. An application program executing on the processor specifies addresses in a virtual memory space. A memory control layer maps addresses from the virtual memory space to addresses of physical memory. In some embodiments, multiple blocks (pages) in the virtual memory space may be mapped to a single physical block of memory. Effectively, these different virtual addresses map to different sub-blocks of the same block of physical memory, where a size of the sub-block is smaller than the predetermined page size.

One exemplary application is provided in the networking domain, wherein a high-performance network switch includes a processor coupled to a relatively expensive memory (e.g., a dual port memory) and a less expensive memory (e.g., a single port memory). However, persons of ordinary skill in the art will recognize that the systems and methods disclosed herein are not limited to any particular embodiment and instead may be employed across a wide range of implementations.

Figure 1:
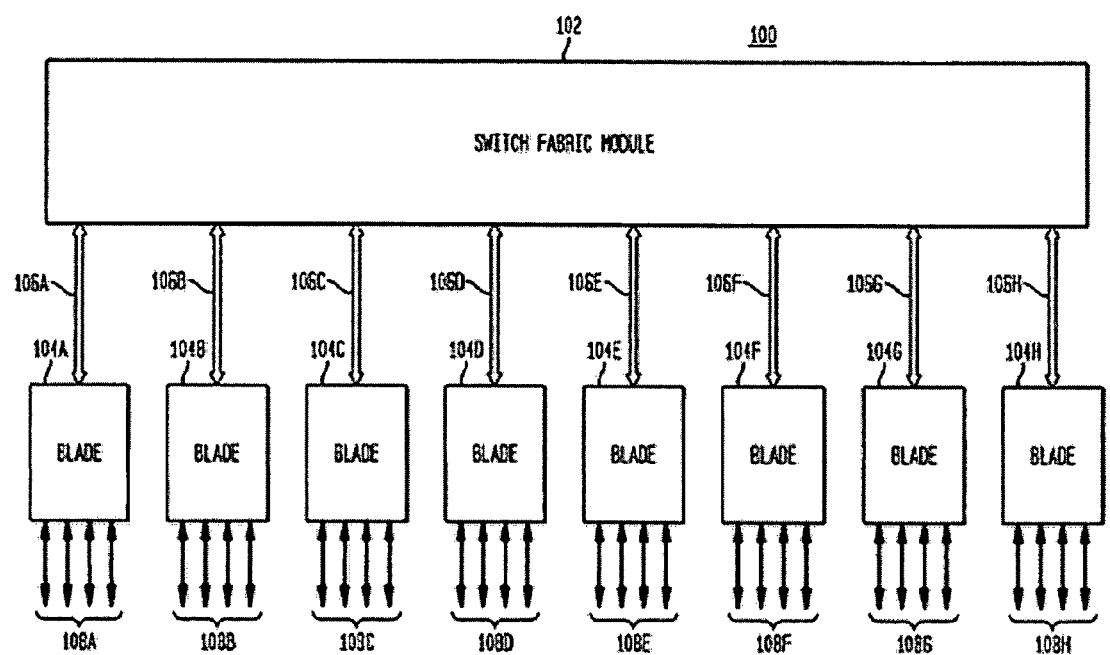
FIG. 1 is a simplified diagram of a high-performance network switch in one embodiment.

FIG. 1 illustrates a simplified diagram of a high performance network switch 100 in one embodiment. Digital switch 100 includes switch fabric 102 and multiple (e.g., eight) blades 104. Each blade 104 includes a plurality of physical ports 108 for receiving various types of digital data from one or more network connections, and a packet processor (not shown) configured to receive and process packets.

Figure 2:
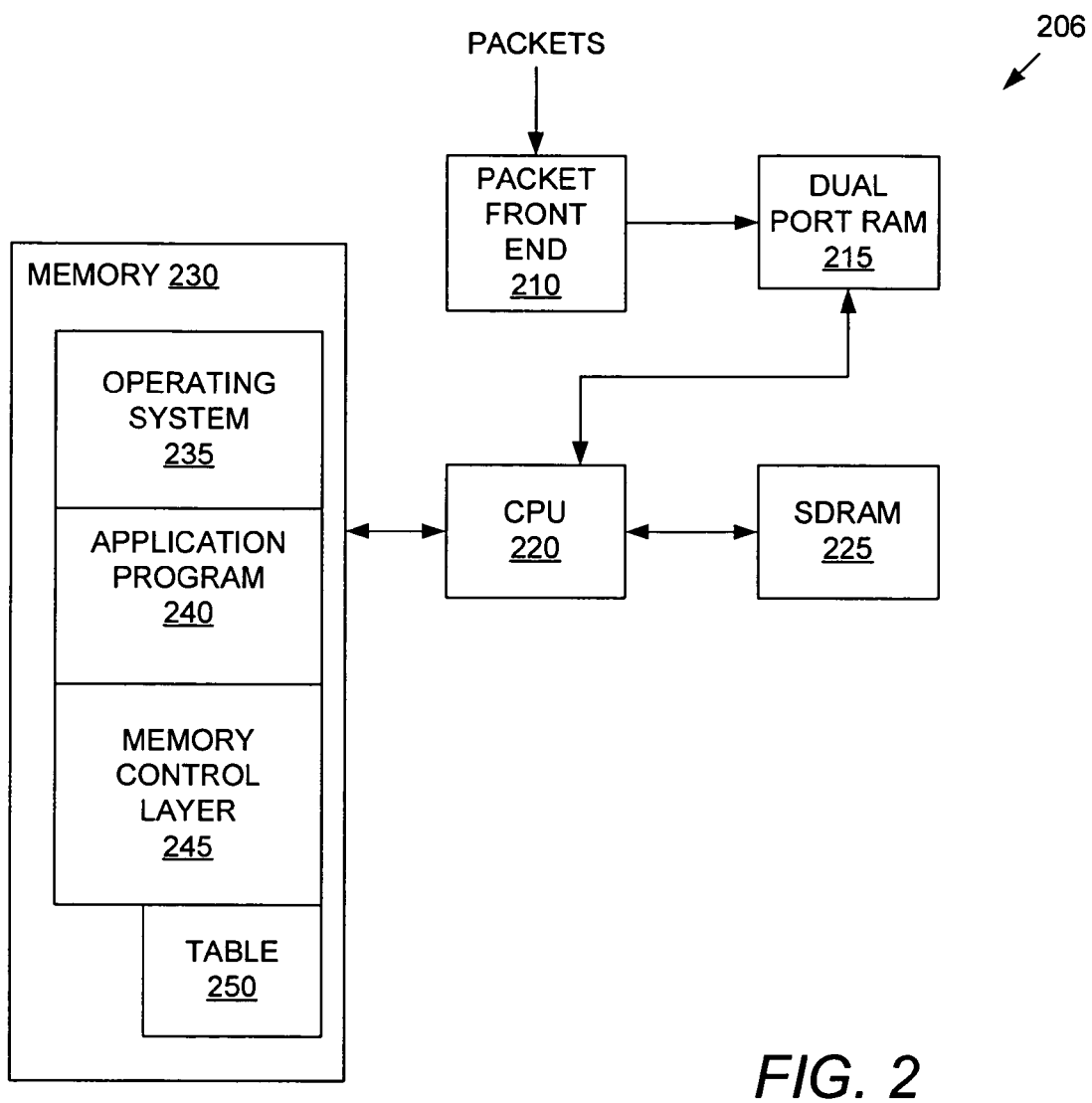
FIG. 2 illustrates a simplified diagram of a packet processor according to one embodiment of the present invention.

FIG. 2 illustrates a simplified diagram of a packet processor 206 according to one embodiment of the present invention. Packet processor 206 includes a packet front end 210 (e.g., a field-programmable gate array) configured to receive and at least partially process incoming packets. Packet front end 210 is configured to store processed packet data, typically from 64 bytes to 1518 bytes in length for each packet, into dual port memory (DPRAM) 215. DPRAM 215 may be from 1 MB to 4 MB in size in some embodiments. CPU 220 (e.g., a Power PC processor) is configured to access DPRAM 215 to further process the packet data stored by packet front end 210.

DPRAM 215 enables simultaneous access by packet front end 210 and CPU 220, thus DPRAM 215 comprises relatively expensive storage (on a cost per bit basis). To reduce costs in packet processor 206, single-port memory SDRAM 225 is included to provide storage that is considerably less expensive than DPRAM 215. SDRAM 225 may be much larger in storage capacity than DPRAM 215 in some embodiments.

Packet processor 206 also includes memory 230 coupled to CPU 220. Memory 230 provides space for operating system (OS) software 235, one or more application programs 240, a memory control layer 245, and a table 250. Application programs 240 may include one or more programs configured to process packet data. Although depicted as separate memories in FIG. 2, SDRAM 225 and memory 230 may physically be embodied as a single memory.

As described further below, to provide for efficient use of memory in packet processor 206, memory control layer 245 is configured to map multiple virtual memory addresses to the same physical address to allow for the allocation of physical memory (e.g., DPRAM 215 and SDRAM 225) in units of sub-blocks, wherein a size of a sub-block is smaller than a predetermined page size supported by CPU 220 and/or OS 235. Memory control layer 245 maintains mapping information that facilitates mapping between virtual memory addresses and sub-blocks in physical memory. In one embodiment, as depicted in FIG. 2, the mapping information may be stored in the form of a table 250. Further, memory control layer 245 is configured to move packet data from DPRAM 215 to SDRAM 225 for long term storage in a manner that is transparent to application programs 240 that use the packet data. Once packet data is moved from DPRAM 215 into SDRAM 225, space may be freed in DPRAM 215 for reuse by packet front end 210.

For instance, CPU 220 and/or OS 235 may be configured (e.g., by hard coding) to perform paging using a fixed page size, such as 4 KB. Memory control layer 245 maps multiple virtual addresses to a physical memory block in DPRAM 215 and/or SDRAM 225. This allows for allocation of a sub-block that is less than 4 KB in size. For example, application program 240 may need less space (e.g., 1 KB) than is provided in a 4 KB page. Memory control layer 245 is configured to map virtual addresses specified by application program 240 to a 4 KB physical memory block. However, since the application program 240 requested for only 1 KB sub-block in memory, where the 1 KB sub-block is smaller than the 4 KB size of the page, memory control layer 245 can allocate the remaining 3 KB to other applications by mapping different virtual addresses to the same real memory block. This mechanism is described further below.

Although memory control layer 245 is described herein as software code executed on CPU 220, persons of ordinary skill in the art will recognize that memory control layer 245 may comprise any combination of hardware and/or software elements. For example, memory control layer 245 may include or be included in a memory management unit (not shown) that is a module of CPU 220 or is closely coupled to CPU 220.

Figure 3:
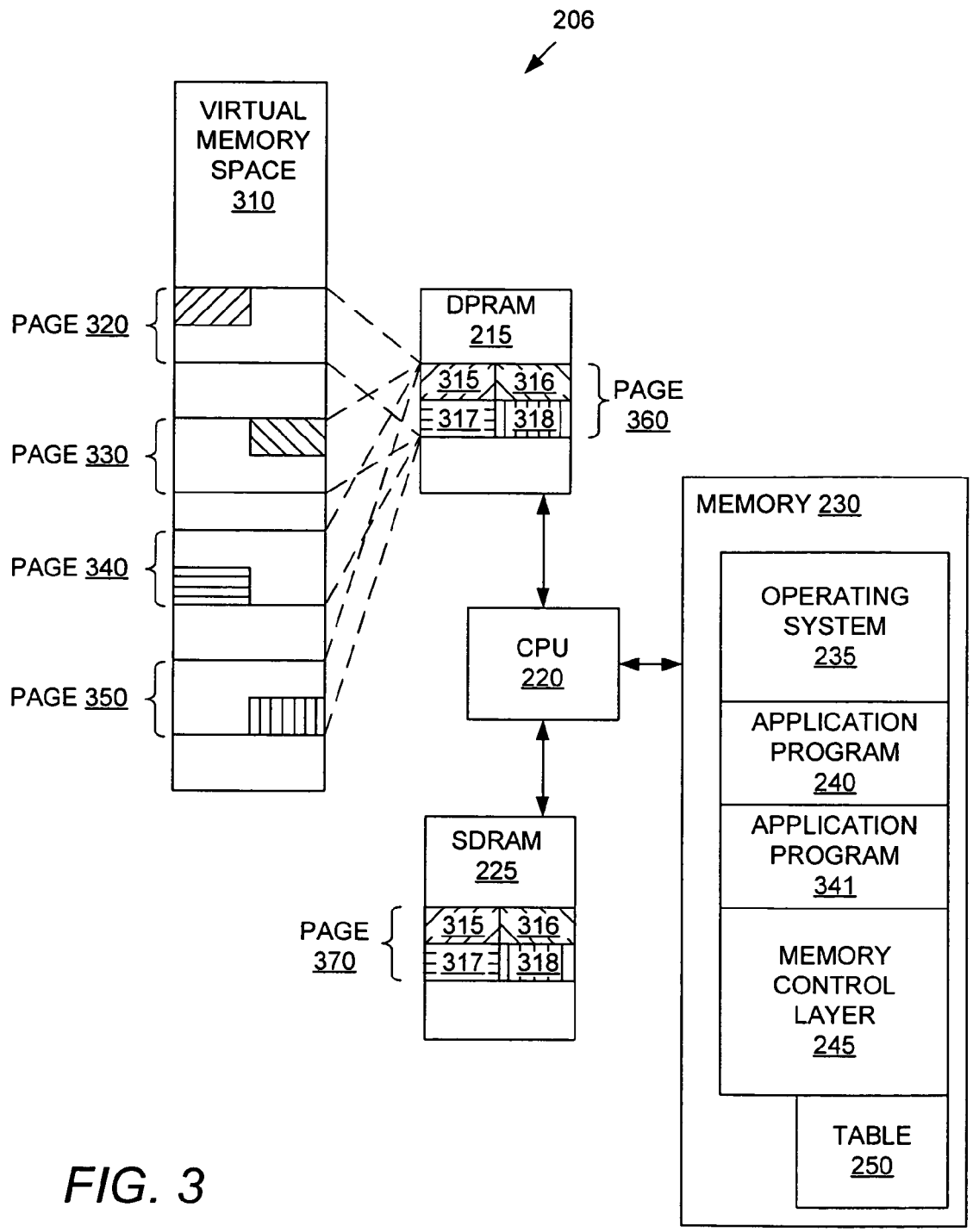
FIG. 3 illustrates an exemplary mapping of a virtual memory space to sub-blocks in dual-port memory and/or SDRAM of FIG. 2, in one embodiment.

FIG. 3 illustrates an exemplary mapping of virtual addresses to physical memory blocks according to an embodiment of the present invention. As depicted in FIG. 3, a set of virtual addresses in virtual memory space 310 are mapped to sub-blocks 315-318 in dual-port memory 215 and/or SDRAM 225 of FIG. 2, in one embodiment. CPU 220 and/or OS 235 may be configured to respond to requests for space from application programs 240 and 341 in a conventional manner by allocating virtual memory space in increments of a predetermined page size (e.g., 4 KB pages 320, 330, 340, and 350). Allocating virtual memory space in a conventional manner advantageously allows use of commercially available CPUs and OSs in packet processor 206.

As depicted in FIG. 3, memory control layer 245 is configured to map addresses specified by an application program (e.g., application program 240) in virtual memory space 310 to a physical memory block in dual-port memory 215 and/or SDRAM 225. If the application programs request for a smaller size memory than the page size supported by CPU 220 and/or OS 235, then the unused physical memory can be allocated to another application by mapping more pages of virtual memory 310 to this physical memory block. Table 250 is used by memory control layer 245 to maintain the mapping of virtual memory addresses to physical memory locations.

For example, application program 240 may request 1 KB of memory space, where the predetermined page size supported by CPU 220 and/or OS 235 is 4 KB. Memory control layer 245 may allocate only the first 1 KB of the 4 KB physical memory block 360 (or 370) and map the virtual memory block 320 to page 360 (or 370). Application program 240 specifies addresses in virtual memory space 310, e.g., within the first 1KB of page 320, and memory control layer 245 may map the virtual addresses to sub-block 315 of page 360 in DPRAM 215 or to sub-block 315 of page 370 in SDRAM 225.

In addition, addresses in virtual memory space 310 allocated to multiple application programs may be mapped so that the multiple application programs share a physical page in memory. For example, a first application program 240 may request 1 KB of memory space, where the predetermined page size supported by CPU 220 and/or OS 235 is 4 KB. Memory control layer 245 may map virtual addresses in page 320 to page 360 of DPRAM 215 and assign sub-block 315 of 1 KB size with address offset of 0 (zero) to the application. Similarly, for a second application program 341, memory control layer 245 may map virtual addresses in page 330 to page 360 and assign sub-block 316 of 1 KB size with an address offset of 1 KB, and so on, e.g., where virtual addresses in a page 340 for a third application program are mapped to page 360 and assign a sub-block 317 of 1 KB size with address offset of 2 KB, and virtual addresses in a page 350 for a fourth application program are mapped to page 360 and assign a sub-block 318 of 1 KB size with address offset of 3 KB.

Although depicted and described with respect to four 1 KB sub-blocks 315-318, memory control layer 245 is configured to map from virtual memory space 310 to sub-blocks in physical memory in a variety of configurations. Virtual addresses may map to physical memory sub-blocks of different sizes equal to or less than the predetermined page size. For instance, a 4 KB page may be divided into two sub-blocks of 2 KB each, where each sub-block is individually addressable using a virtual address that maps to the sub-block. In such case, a first mapping may use a first sub-block with an address offset of 0 (zero) and a second mapping may utilize a second sub-block with an address offset of 2 KB. In some embodiments, memory control layer 245 is configured to map to sub-blocks of varying sizes within a page, for example to support mapping of two 512 B sub-blocks, one 1 KB sub-block, and one 2 KB sub-block within a 4 KB page. Other variations will be apparent to persons of ordinary skill in the art given the present disclosure.

Virtual memory space 310 may be (but is not necessarily) much larger than the physical address space used in addressing DPRAM 215, SDRAM 225, and/or other memories of packet processor 206. For example, virtual addresses may comprise 40 bits of addressing information sufficient to address up to 1 terabyte of information, while the physical address space used in addressing DPRAM 215, SDRAM 225, and/or other memories of network switch 100 may comprise 32 bits of addressing information.

Physical locations of sub-blocks may be changed in a manner transparent to application programs 240 while still allowing for the sub-blocks to be accessed using virtual addresses. For example, memory control layer 245 may move one or more sub-blocks 315-318 from relatively expensive storage space in DPRAM 215 to relatively inexpensive storage space in SDRAM 225, even if the locations of other sub-blocks are not moved. Sub-blocks 315-317 may be moved from page 360 of DPRAM 215 to page 370 of SDRAM 225, even while sub-block 318 remains located in page 360 of DPRAM 215.

For example, memory control layer 245 may determine that application program 240 needs to perform further processing on sub-block 315 that is resident in DPRAM 215. Sub-block 315 may contain packet data initially processed by packet front end 210 (FIG. 2). Application program 240 could operate on the data from DPRAM 215 in a conventional fashion, but doing so would consume expensive storage space. Thus, to free storage space in DPRAM 215 and still provide access to data in sub-block 315, memory control layer 245 is configured to move the data from DPRAM 215 to SDRAM 225 and correspondingly change the mapping for the location of the data in SDRAM 225. This is done by mapping the virtual page 320 to page 370 instead of page 360. Since the other applications that are using the other sub-blocks 316-318 of page 360 are using different virtual pages 330, 340 and 350, their data remains in DPRAM and are unaffected by the move of sub-block 315.

Because application programs specify addresses in virtual memory space 310, memory control layer 245 can move data from DPRAM 215 to SDRAM 225 in a manner that is transparent to application programs. For example, application program 240 need not be aware of the physical location of the sub-block, whether the sub-block is in DPRAM 215 or SDRAM 225. Instead, application program 240 can access the data in sub-block 315 by using virtual addresses, and memory control layer 245 takes care of the mapping of the virtual address to the actual physical address of sub-block 315 in DPRAM 215 or SDRAM 225.

Dynamic Table Enables Mapping from Virtual to Physical

To manage the mapping from virtual addresses to physical addresses, memory control layer 245 creates entries in table 250 for each sub-block. Table 250 is configured to store mappings from virtual addresses to physical addresses in increments of page size (e.g. 4 KB). For example, in an instruction "ADD R3, 0x004050" specified by application program 240, address 0x004050 is a virtual address in virtual memory space 310. Table 250 includes an entry to map the virtual address 0x004050 to a physical address, for example 0x2050 in SDRAM 225, so that data can be accessed from that location in SDRAM 225.

A feature of table 250 is that it provides for a dynamic mapping from virtual memory space 310 to physical memory. In addition to table 250, some CPUs provide a cache (a small table of 64 entries) that is a subset of table 250 for better performance.

Note that each sub-block (e.g., sub-block 315) can be any size, but increasing the number of sub-blocks for each page increases the number of entries in table 250 in an exponential manner. For example, for each 4 KB page, allocating two 2 KB sub-blocks for each page utilizes 2 entries in table 250; allocating four 1 KB sub-blocks for each page utilizes 4 entries in table 250; and allocating eight 512 B sub-blocks for each page utilizes 8 entries in table 250. Thus, the more sub-blocks allocated to each page, the more storage space needed for table 250.

The size of sub-blocks allocated by memory control layer 245 may be determined based on various factors, and may be application specific. In one network switch embodiment, sub-block size may be based upon packet size.

In some embodiments, memory control layer 245 is configured to allocate sub-blocks of the same size in each page (e.g., eight 512 B sub-blocks in a page). In alternative embodiments, memory control layer 245 is configured to allocate sub-blocks of different sizes within a page. For example, a single 4 KB page may be subdivided into a number of 2 KB blocks, a number of 1 KB blocks, and a number of 512 B blocks.

In some embodiments, memory control layer 245 is configured to allocate sub-blocks differently in different pages. For example, a first page of 4 KB may be allocated based upon eight 512 B sub-blocks, and a second page of 4 KB may be allocated based upon two 2 KB sub-blocks. Memory control layer 245 may include appropriate logic to prevent allocation of sub-blocks from overrunning the page size (e.g., to prevent allocation of two 1 KB sub-blocks and two 2 KB sub-blocks within a single 4 KB page).

Access Protection

Conventional virtual memory mapping systems typically include one or more access protection mechanisms that prevent unauthorized access/modification by application programs, wherein a first application program is prevented from modifying address spaces of other application programs. Such access restrictions are conventionally specified at a virtual block (page) level and do not extend to the sub-block level.

With the systems and methods disclosed herein, a page is subdivided into sub-blocks and the sub-blocks associated with a given physical page (e.g. sub-blocks 315 and 316 in page 360 of DPRAM 215) may be allocated to different application programs. It may thus be possible for a first application program to overwrite and corrupt the memory space allocated to a second application program. For example, if sub-block 315 in DPRAM 215 is allocated to a first application program 240, and sub-block 316 is allocated to a second application program 341, because both application programs 240 and 341 may access page 360 with conventional page level access protection mechanisms, it may be possible for application program 240 to overwrite data in sub-block 316 used by application program 341.

Different techniques may be used to address this issue. According to a first technique, if packet processor 206 includes only a single application program operating at any one time, then violations of protection mechanisms will not result, and the systems and methods described above can be used without any alteration.

According to a second technique, if packet processor 206 has multiple application programs running and/or such application programs rely on conventional memory protection mechanisms, memory control layer 245 may keep track of the various application programs requesting access to memory, and all sub-blocks of a given physical page of memory are allocated to a single application program. In this fashion, sub-blocks of a page in DPRAM 215, for example, may be allocated to a single application program and access protections can be enforced, even while allowing sub-blocks to be moved among different types of memory independent of each other.

For example, if all sub-blocks 315-318 associated with physical page 360 of DPRAM 215 are allocated to a single application program 240, memory control layer 245 may move one or more of sub-blocks 315-318 to SDRAM 225 independent of other sub-blocks 315-318. Memory control layer 245 might move sub-block 315 from DPRAM 215 to SDRAM 225, while keeping sub-blocks 316-318 resident in DPRAM 215. Because all sub-blocks 315-318 of page 360 are allocated to a single application program 240, other application programs (e.g., application program 341) will not interfere with data in sub-blocks 315-318, regardless of the physical location of the sub-blocks.

Optimal Sub-Block Size Selection

In order to select appropriate sizes for sub-blocks, memory control layer 245 manages one or more pools (not shown) of sub-blocks of various sizes. For example, a first pool may include a number M (e.g., 200) of sub-blocks each of size 512 bytes, a second pool may contain a number N (e.g., 500) of sub-blocks each of size 1024 bytes, a third pool may contain a number P (e.g., 250) of sub-blocks each of size 2048 bytes, and so on.

In some embodiments, when an application program requests a sub-block of a given size "S," memory control layer 245 is configured to return the smallest available sub-block of size at least S. For instance, if application program 240 requests a sub-block of size 734 bytes (e.g., corresponding to a packet 734 bytes in size stored in DPRAM 215 by packet front end 310), then memory control layer 245 may allocate a sub-block from the second pool of 1024 byte sub-blocks.

Figure 4:
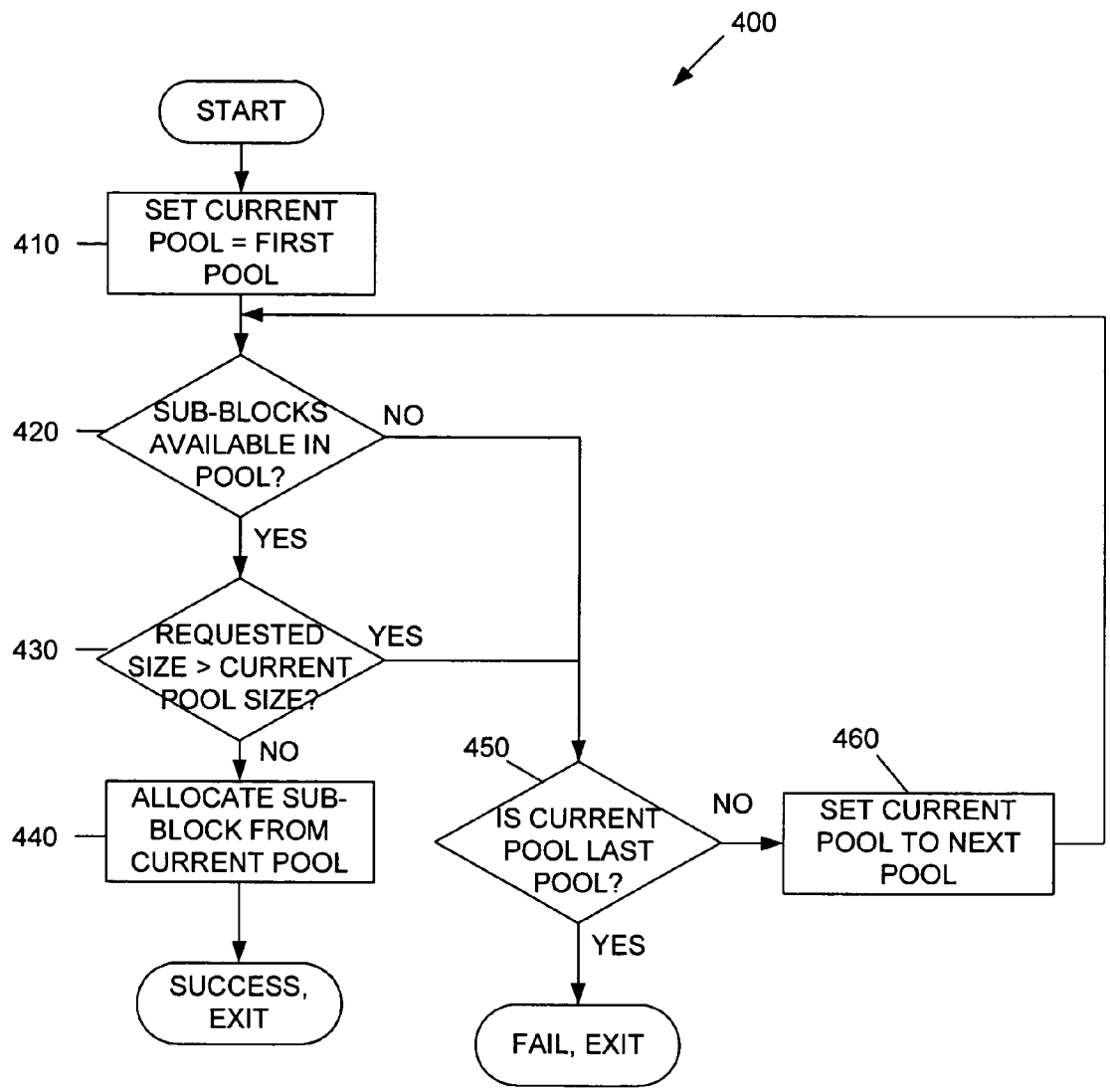
FIG. 4 illustrates a flowchart for a method that may be utilized in memory control layer of FIG. 3 for finding an appropriate pool for allocating sub-blocks, based upon the size requested by an application program, in one embodiment.

FIG. 4 illustrates a flowchart 400 for a method that may be utilized in memory control layer 245 of FIGS. 2-3 for finding an appropriate pool for allocating sub-blocks, based upon the size requested by an application program, in one embodiment.

In overview, the method iterates through pools of sub-blocks to find the smallest available sub-block that is larger than a size requested by an application program. The method starts checking the "fit" of the current sub-block to the requested sub-block size, in order, from the smallest possible sub-block up to the largest possible sub-block. The method begins with a first pool of smallest sub-blocks, checks whether there are available sub-blocks in the pool and whether the size of the sub-blocks in the pool is larger than the size requested by the application program. If not, the method checks pools of progressively larger sub-blocks to find the smallest available sub-block that is larger than a size requested by the application program.

Although flowchart 400 includes a number of acts described below as occurring in a given order, persons of ordinary skill in the art will recognize that the order of one or more of the acts may be changed, and one or more of the acts may be skipped, depending upon the particular implementation. Such variations are considered to be within the scope of the present invention.

At act 410, the method starts with the first pool by setting the current pool to the first pool. At act 420, a check is made to determine if there are unallocated (free) sub-blocks available in the current pool.

If at act 420 there are free sub-blocks available in the current pool, then at act 430 a check is made to determine if the sub-block size requested by the application program is greater than the sub-block size of the current pool.

If at act 430 the requested sub-block size is not greater than the sub-block size of the current pool, then at act 440 memory control layer 245 may allocate a sub-block from the current pool, and the method successfully exits.

If at act 420 there are no free sub-blocks available in the current pool, or if at act 430 the requested sub-block size is greater than the sub-block size of the current pool, then at act 450 a check is made to determine if the current pool is the last pool (the largest sub-block size supported). If the current pool is the last pool at act 450, then the requested sub-block cannot be allocated, and the method fails and exits. Upon failure of the method where allocation of the buffer fails, the requesting application is notified so that the application can take appropriate action, such as dropping the packet since the system has run out of resources. Alternatively, if the current pool is not the last pool at act 450, then the requested sub-block can be allocated, and the method returns to act 420.

The method described with respect to FIG. 4 provides a relatively straightforward solution for allocating sub-blocks from pools of sub-blocks in memory control layer 245. However, as the number of pools of sub-blocks is increased, it may take longer to allocate large sub-blocks since the method of FIG. 4 starts checking the "fit" of the current sub-block to the requested sub-block size in order from the smallest possible sub-block up to the largest possible sub-block. Generally speaking, the method of FIG. 4 could take at least "N" iterations if the correct sub-block size is from pool number N (e.g., four iterations if the appropriate sub-block size is from pool number four). If the Nth pool has no free sub-blocks in act 420, then the method of FIG. 4 could take more than N iterations and continue until a pool is found that has sub-blocks available to be allocated.

Figure 5:
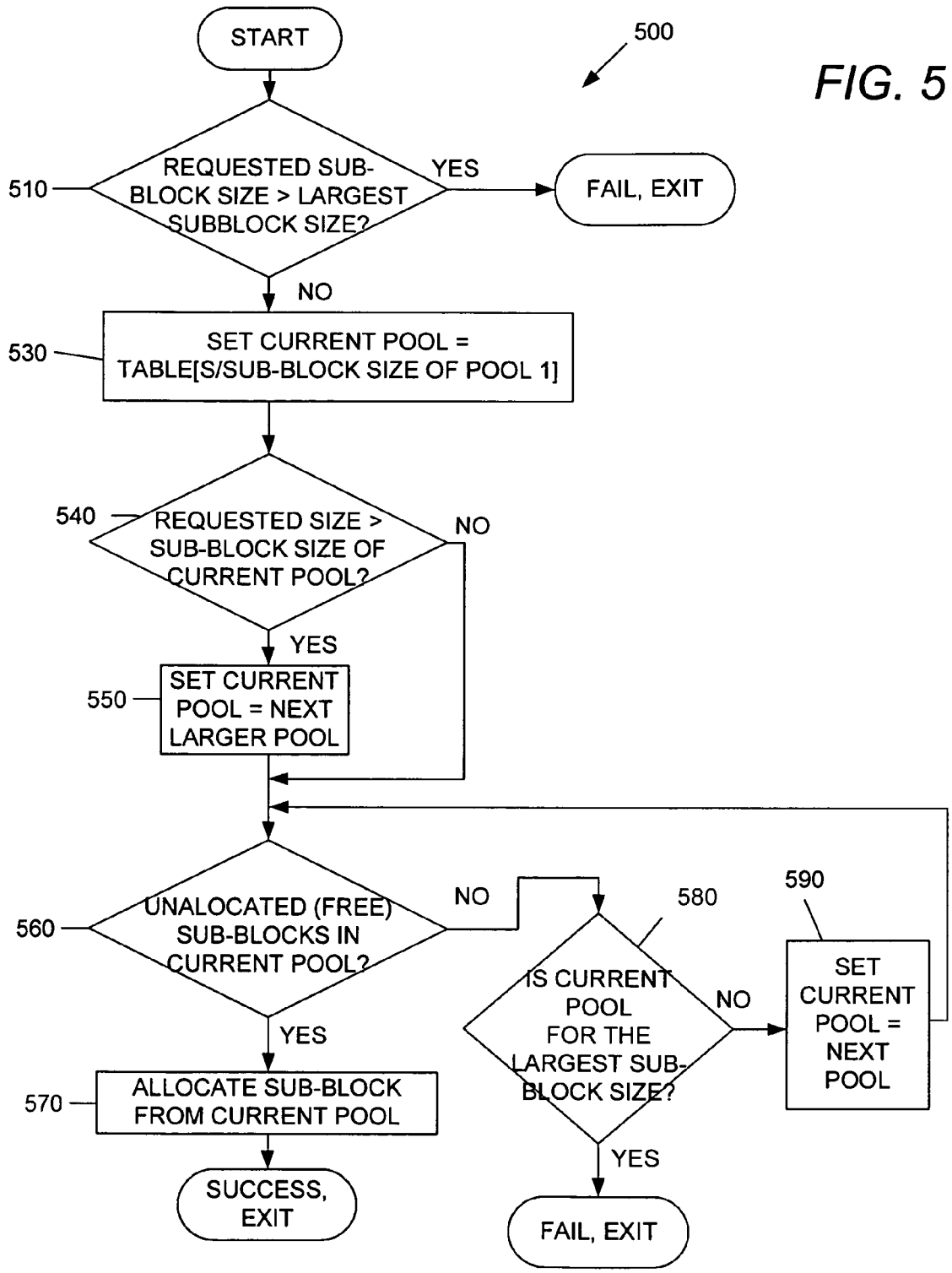
FIG. 5 illustrates a flowchart for an alternate method that may be utilized in memory control layer of FIG. 3 for finding an appropriate pool for allocating sub-blocks based upon the size requested by an application program, in one embodiment.

FIG. 5 illustrates a flowchart 500 for an alternate method that may be utilized in memory control layer 245 of FIGS. 2-3 for finding an appropriate pool for allocating sub-blocks, based upon the size requested by an application program, in some embodiments. In such embodiments, pool sub-block sizes are organized into a predetermined pattern so that a sub-block can be allocated in a rapid manner.

Examples of patterns may include an organization of pool sub-block sizes in increasing powers of 2, such as a first pool of a number M of sub-blocks each of size 512 bytes, a second pool of a number N of sub-blocks each of size 1024 bytes, a third pool of a number P of sub-blocks each of size 2048 bytes, and so on. In another embodiment, pool sub-block sizes are organized in an arithmetic progression, such as a first pool of a number M of sub-blocks each of size 512 bytes, a second pool of a number N of sub-blocks each of size 1024 bytes, a third pool of a number P of sub-blocks each of size 1536 bytes, and so on.

Flowchart 500 is described below with respect to an organization of pool sub-block sizes in increasing powers of 2, using pool sizes of sub-blocks of size as small as 512 bytes, with increasing sub-block size up to a seventh pool having sub-block size of 32768 bytes. Thus, pool sub-block sizes include a first pool of sub-blocks each of size 512 B, a second pool of sub-blocks each of size 1024 B, a third pool of sub-blocks each of size 2048 B, and so on, up to a seventh pool of sub-blocks each of size 32768 B. However, persons of ordinary skill in the art will recognize that other organizations of pool sub-block sizes may be used to extend the method to other organizations of sub-block sizes. Further, although flowchart 500 includes a number of acts described below as occurring in a given order, persons of ordinary skill in the art will recognize that the order of one or more of the acts may be changed, and one or more of the acts may be skipped, depending upon the particular implementation. Such variations are considered to be within the scope of the present invention.

In these embodiments, a table (not shown) that may be stored in memory 230 of FIG. 3 includes a number of elements (e.g., 65), in which each element identifies a pool number. In general, the number of elements in the table for a number N of pools with sub-block sizes organized by increasing powers of 2 is given by: number of elements=$2^{n-1}+1$.

Elements of the table may be initially calculated as follows:

Table[1]=1;

Table[2]=1;

and for other elements, Table[m]=ceil(lg(m−1))+1, where ceil( ) is a mathematical function that rounds up any fractions (e.g., 2.4 is rounded up to 3) and lg( ) is a Base 2 logarithm function.

For example, the table may initially include:

Table[1]=1;

Table[2]=1;

Table[3]=ceil(lg(3−1))+1=ceil(1)+1=2;

Table[4]=ceil(lg(4−1))+1=ceil(1.58)+1=3;

Table[5]=ceil(lg(5−1))+1=ceil(2)+1=3;

Table[6]=ceil(lg(6−1))+1=ceil(2.32)+1=4; and so on.

A representation of elements contained in the table may include:

TABLE 65

{
POOL 1, POOL 1, POOL 2, POOL 3, POOL 3, POOL 4, POOL 4,
POOL 4, POOL 4, POOL 5, POOL 5, POOL 5, POOL 5, POOL 5,
POOL 5, POOL 5, POOL 5, POOL 6, POOL 6, POOL 6, POOL 6,
POOL 6, POOL 6, POOL 6, POOL 6, POOL 6, POOL 6, POOL 6,
POOL 6, POOL 6, POOL 6, POOL 6, POOL 6, POOL 7, POOL 7,
POOL 7, POOL 7, POOL 7, POOL 7, POOL 7, POOL 7, POOL 7,
POOL 7, POOL 7, POOL 7, POOL 7, POOL 7, POOL 7, POOL 7,
POOL 7, POOL 7, POOL 7, POOL 7, POOL 7, POOL 7, POOL 7,
POOL 7, POOL 7, POOL 7, POOL 7, POOL 7, POOL 7, POOL 7,
POOL 7, POOL 7
}.

This table may be computed and stored once during initialization. Then, to fulfill a request for a sub-block of size S, an appropriate pool can be calculated as follows:

1. Pool number=Table[s/(sub-block size of Pool 1)];

2. If requested size S is larger than (sub-block size of Pool Number), then increment Pool number by 1.

The method can be efficiently implemented for sub-block size of powers of 2. For example, for a Pool number 1 sub-block size of 512, a result may be: Pool_num=Table[S>>9]

If(S>((Pool_num+8)<<1))
    Pool_num=Pool_num+1 where >> is a bit-wise right shift operator and << is a bit-wise left shift operator.

A feature of the above-described method is that the method directly determines an appropriate pool for a requested size S, rather than analyzing the fit of the smallest sub-block pool and then iterating through the larger pools to determine an appropriate pool as described with respect to FIG. 4. Note that if the determined pool does not have any sub-blocks available, then the method may include iterating through the available pools to find the next larger pool that still has sub-blocks to allocate.

As shown in flowchart 500 of FIG. 5, the method includes the following. At act 510, a check is made to determine if the requested sub-block size S is greater than the last pool (largest) sub-block size. If the requested sub-block size S is greater than the largest sub-block size, then the requested sub-block cannot be allocated, and the method returns Failure status and exits.

If at act 510 the requested sub-block size S is not greater than the largest sub-block size, then at act 530, the current pool is set to Table[s/(sub-block size of Pool 1)]. At act 540, a check is made to determine if the requested size S is larger than the sub-block size of the current pool. At act 550, if the requested size S is larger than the sub-block size of the current pool, then the current pool is set to the next larger pool, and the method goes to act 560.

At act 540 if the requested size S is not larger than the sub-block size of the current pool, then at act 560 a check is made to determine if there are unallocated (free) sub-blocks available in the current pool. If there are unallocated (free) sub-blocks available in the current pool, then at act 570 a sub-block from the current pool is allocated, and the method successfully exits.

If at act 560 there are no unallocated (free) sub-blocks available in the current pool, then at act 580 a check is made to determine if the current pool is for the last pool (the largest sub-block size supported). If at act 580 the current pool is for the last pool, then the requested sub-block cannot be allocated, and the method returns Failure status and exits. If at act 580 the current pool is not for the last pool, then at act 590 the current pool is set to the next larger pool, and the method returns to act 560.

Although specific embodiments of the invention have been described, various modifications, alterations, alternative constructions, and equivalents are also encompassed within the scope of the invention. The present invention may be implemented only in hardware, or only in software, or using combinations thereof. For example, CPU 220 and/or OS 235 may incorporate functions described as being performed by memory control layer 245. Although described with respect to an exemplary embodiment of a packet processor, the systems and methods described herein are not so limited and may be applied in a variety of computing systems. Additionally, although the present invention has been described using a particular series of transactions and steps, it should be apparent to those skilled in the art that the scope of the present invention is not limited to the described series of transactions and steps.

THE SPECIFICATION AND DRAWINGS ARE, ACCORDINGLY, TO BE REGARDED IN AN ILLUSTRATIVE RATHER THAN A RESTRICTIVE SENSE. IT WILL, HOWEVER, BE EVIDENT THAT ADDITIONS, SUBTRACTIONS, DELETIONS, AND OTHER MODIFICATIONS AND CHANGES MAY BE MADE THEREUNTO WITHOUT DEPARTING FROM THE BROADER SPIRIT AND SCOPE OF THE INVENTION AS SET FORTH IN THE CLAIMS

What is claimed is:

1. A system comprising:
a memory control module configured to:
select, based on a size of first data, a first sub-block from a set of sub-blocks having sub-blocks of at least two different sizes, wherein the first sub-block is resident in a first page of physical memory, and wherein the first sub-block has a size smaller than a predetermined page size;
map a first virtual address associated with the first data to the first page of physical memory; and
allocate the first sub-block for storing the first data.

2. The system of claim 1 wherein the memory control module is further configured to:
select, based on a size of second data, a second sub-block from the set of sub-blocks, the second sub-block also being resident in the first page of physical memory;
map a second virtual address associated with the second data to the first page of physical memory; and
allocate the second sub-block for storing the second data.

3. The system of claim 2 wherein the memory control module is further configured to move the first sub-block from a first physical memory to a second physical memory without moving the second sub-block from the first physical memory.

4. The system of claim 3 wherein the first physical memory comprises expensive storage and the second physical memory comprises inexpensive storage.

5. The system of claim 2 wherein a size of the first sub-block and a size of the second sub-block are the same.

6. The system of claim 2 wherein a size of the first sub-block and a size of the second sub-block are different.

7. The system of claim 1 wherein the system further comprises a packet processor configured to receive a data packet, and wherein the first sub-block is selected from the set of sub-blocks based upon a size of the data packet.

8. A method comprising:
selecting, based on a size of first data, a first sub-block from a set of sub-blocks having sub-blocks of at least two different sizes, wherein the first sub-block is resident in a first page of physical memory, and wherein the first sub-block is smaller than a predetermined page size;
mapping a first virtual address associated with the first data to the first page of physical memory; and
allocating the first sub-block for storing the first data.

9. The method of claim 8 further comprising:
selecting, based on a size of second data, a second sub-block from the set of sub-blocks, the second sub-block also being resident in the first page of physical memory;
mapping a second virtual address associated with the second data to the first page of physical memory; and
allocating the second sub-block for storing the second data.

10. The method of claim 9 further comprising moving the first sub-block from a first physical memory to a second physical memory without moving the second sub-block from the first physical memory.

11. The method of claim 9 wherein a size of the first sub-block is the same as a size of the second sub-block.

12. The method of claim 9 wherein a size of the first sub-block is different from a size of the second sub-block.

13. The method of claim 8 further comprising receiving a data packet, wherein the first sub-block is selected from the set of sub-blocks based on a size of the data packet.

14. A system comprising:
a processor configured to:
specify a first virtual address; and
map the first virtual address to a first sub-block in a first page of memory, the first sub-block having a size smaller than a predetermined page size,
wherein a size of the first sub-block is based upon a size of a received data packet.

15. The system of claim 14 wherein the processor is further configured to:
specify a second virtual address; and
map the second virtual address to a second sub-block in the first page.

16. The system of claim 15 wherein the processor is further configured to move the first sub-block from a first physical memory to a second physical memory and not move the second sub-block from the first physical memory.

17. The system of claim 15 wherein a size of the first sub-block is the same as a size of the second sub-block.

18. The system of claim 15 wherein a size of the first sub-block is different than a size of the second sub-block.

19. A network switch comprising:
a switching fabric; and
plural blades coupled to the switching fabric, at least one of the blades comprising:
a memory control module configured to:
select, based on a size of first data, a first sub-block from a set of sub-blocks having sub-blocks of at least two different sizes, wherein the first sub-block is resident in a first page of physical memory, and wherein the first sub-block has a size smaller than the first page;
map a first virtual address associated with the first data to the first page of physical memory; and
allocate the first sub-block for storing the first data.

20. The network switch of claim 19 wherein the memory control module is further configured to:
select, based on a size of second data, a second sub-block from the set of sub-blocks, the second sub-block also being resident in the first page of physical memory;
map a second virtual address associated with the second data to the first page of physical memory; and
allocate the second sub-block for storing the second data.

21. The system of claim 1 wherein the set of sub-blocks includes at least a first pool of sub-blocks having sub-blocks of a first size and a second pool of sub-blocks having sub-blocks of a second size,
wherein the first size is smaller than the second size, and
wherein selecting the first sub-block comprises:
determining if there are free sub-blocks available in the first pool;
if there are free sub-blocks available in the first pool, determining if the size of the first data is greater than the first size; and
if the size of the first data is not greater than the first size, allocating a free sub-block from the first pool for storing the first data.

22. The system of claim 21 wherein selecting the first sub-block further comprises:
- if there are no free sub-blocks available in the first pool or if the size of the first data is greater than the first size, determining if there are free sub-blocks available in the second pool;
- if there are free sub-blocks available in the second pool, determining if the size of the first data is greater than the second size;
- if the size of the first data is not greater than the second size, allocating a free sub-block from the second pool for storing the first data; and
- if there are no free sub-blocks available in the second pool or if the size of the first data is greater than the second size, generating an error indicating that no appropriate sub-block can be allocated.

23. The method of claim 8 wherein the set of sub-blocks includes at least a first pool of sub-blocks having sub-blocks of a first size and a second pool of sub-blocks having sub-blocks of a second size,
- wherein the first size is smaller than the second size, and
- wherein selecting the first sub-block comprises:
  - determining if there are free sub-blocks available in the first pool;
  - if there are free sub-blocks available in the first pool, determining if the size of the first data is greater than the first size; and
  - if the size of the first data is not greater than the first size, allocating a free sub-block from the first pool for storing the first data.

24. The method of claim 23 wherein selecting the first sub-block further comprises:
- if there are no free sub-blocks available in the first pool or if the size of the first data is greater than the first size, determining if there are free sub-blocks available in the second pool;
- if there are free sub-blocks available in the second pool, determining if the size of the first data is greater than the second size;
- if the size of the first data is not greater than the second size, allocating a free sub-block from the second pool for storing the first data; and
- if there are no free sub-blocks available in the second pool or if the size of the first data is greater than the second size, generating an error indicating that no appropriate sub-block can be allocated.

25. The network switch of claim 19 wherein the set of sub-blocks includes at least a first pool of sub-blocks having sub-blocks of a first size and a second pool of sub-blocks having sub-blocks of a second size,
- wherein the first size is smaller than the second size, and
- wherein selecting the first sub-block comprises:
  - determining if there are free sub-blocks available in the first pool;
  - if there are free sub-blocks available in the first pool, determining if the size of the first data is greater than the first size; and
  - if the size of the first data is not greater than the first size, allocating a free sub-block from the first pool for storing the first data.

26. The network switch of claim 25 wherein selecting the first sub-block further comprises:
- if there are no free sub-blocks available in the first pool or if the size of the first data is greater than the first size, determining if there are free sub-blocks available in the second pool;
- if there are free sub-blocks available in the second pool, determining if the size of the first data is greater than the second size;
- if the size of the first data is not greater than the second size, allocating a free sub-block from the second pool for storing the first data; and
- if there are no free sub-blocks available in the second pool or if the size of the first data is greater than the second size, generating an error indicating that no appropriate sub-block can be allocated.

* * * * *